(12) United States Patent
Robinson et al.

(10) Patent No.: US 6,386,343 B1
(45) Date of Patent: May 14, 2002

(54) TEMPERATURE COMPENSATING FLUX RING

(75) Inventors: Frank M. Robinson, Dayton; Aaron A. Kime, Monroe, both of OH (US); Alain J. Bataille, Paris (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/845,707

(22) Filed: Apr. 30, 2001

(51) Int. Cl.[7] ............................................... F16F 15/03
(52) U.S. Cl. ....................................................... 188/267
(58) Field of Search ............................... 188/266, 267.1, 188/267.2, 269; 267/140.14, 140.15

(56) References Cited

U.S. PATENT DOCUMENTS

| | | | | |
|---|---|---|---|---|
| 5,259,487 A | * | 11/1993 | Petek | 188/267 |
| 5,588,509 A | * | 12/1996 | Weitzenhof et al. | 188/267 |
| 5,878,851 A | * | 3/1999 | Carlson et al. | 188/269 |
| 5,947,238 A | * | 9/1999 | Jolly et al. | 188/267.1 |
| 6,095,486 A | * | 8/2000 | Ivers et al. | 251/129.01 |
| 6,260,675 B1 | * | 7/2001 | Muhlenkamp | 188/267 |

* cited by examiner

Primary Examiner—Christopher P. Schwartz
(74) Attorney, Agent, or Firm—Scott A. McBain

(57) ABSTRACT

A piston assembly for magneto rheological (MR) fluid vibration damper affixed to a suspension system includes a piston that strokes inside a housing to dampen vibrations. The piston includes a core affixed to a piston shaft. An electric coil is affixed to the core and is coaxially aligned with the piston shaft. A sleeve circumscribes the piston core having a wall with a first inner diameter. An annular fluid passage is formed between the sleeve and the core. Fluid passes through the annular passage when the piston strokes inside the damper. The wall includes a channel having a second inner diameter greater than the first inner diameter. The channel reduces resistance to the piston from the MR fluid derived from temperature induced viscosity variations.

49 Claims, 5 Drawing Sheets

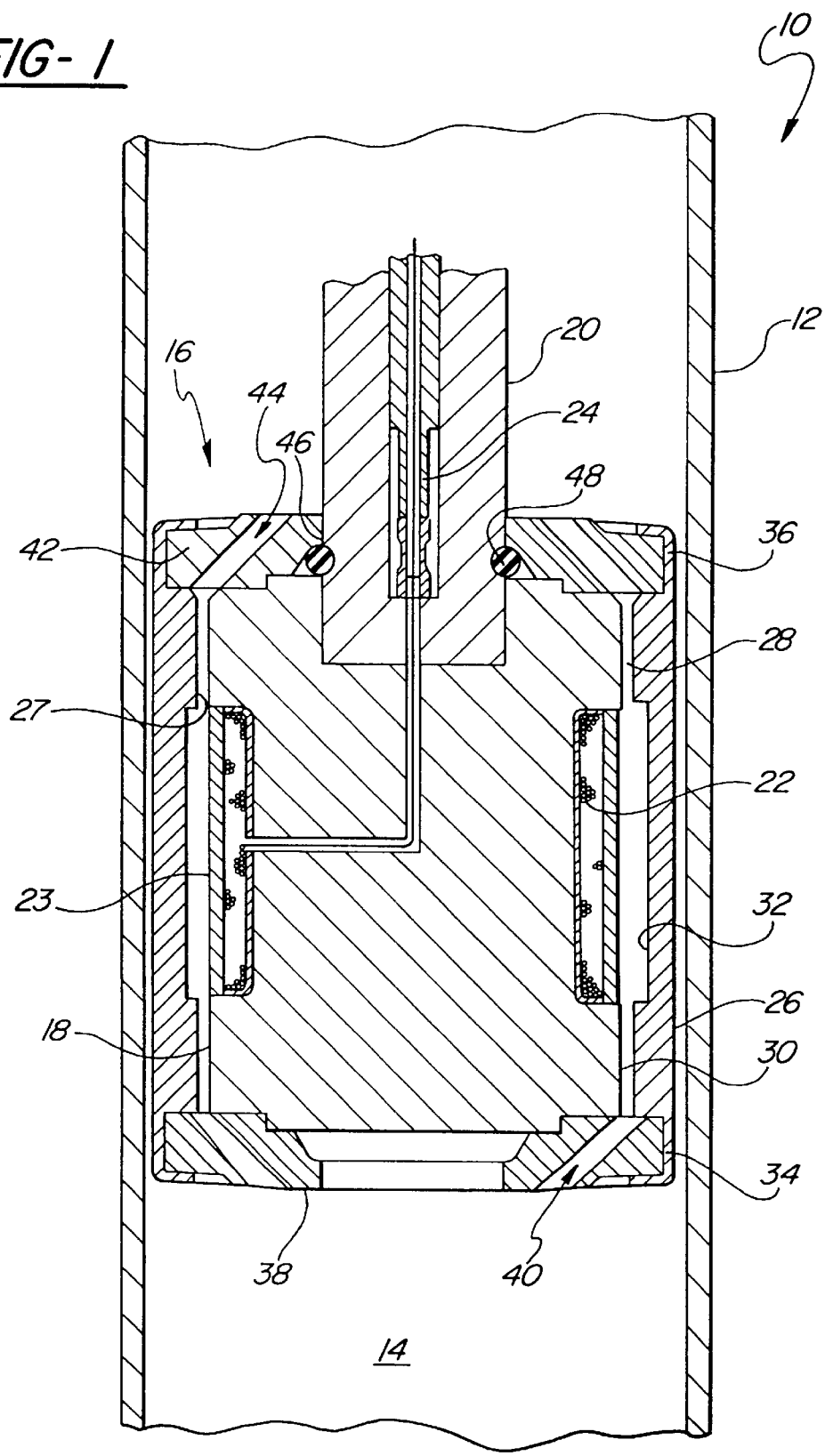

TEMPERATURE COMPENSATING FLUX RING

TECHNICAL FIELD

The present invention relates generally to an improved piston for a magneto rheological vibration damper of a motor vehicle suspension system.

BACKGROUND OF THE INVENTION

Suspension systems for motor vehicles typically include a vibration damper to reduce vibrations derived from such variables as rough road surfaces, potholes, and unbalanced tires. Vibration damping is achieved by a piston stroking inside the damper each time the suspension system is vibrated. The piston strokes inside the damper through a fluid that resists the stroking action. The resistance to the piston stroking reduces the amount of vibration transmitted throughout the vehicle. The damping properties of the damper have proven to be enhanced through the use of magneto rheological (MR) fluid inside the damper. The sheer resistance of the MR fluid is altered proportionally to the strength of a magnetic field emitted through the fluid. Thus, the damping properties can be modified according to the variables producing the vibration.

A typical piston design includes a sleeve that circumscribes a piston core. MR fluid flows through a passage formed between the sleeve and the core as the piston strokes inside the damper. The vibration damping is derived from the resistance to the stroking action of the piston generated from the MR fluid inside the fluid passage. However, when the MR fluid is subjected to temperature extremes, its viscosity is known to change. The viscosity of the MR fluid impacts the damping properties of the damper in addition to the sheer resistance of the MR fluid. Temperature related viscosity variations deviate the desired damping properties of the vibration damper.

Therefore, it would be desirable to reduce the impact temperature related viscosity variations of the MR fluid have on the damping properties of the vibration damper.

SUMMARY OF THE INVENTION

The present invention relates to a piston assembly for a magneto rheological (MR) fluid vibration damper for a motor vehicle suspension system. A piston assembly strokes inside a housing filled with MR fluid. The piston assembly includes a piston core affixed to the end of a piston shaft. The core has an outer wall and includes an electric coil coaxially aligned with the piston shaft. The coil is connected to an electric wire that is inserted through the piston shaft. The coil generates a magnetic field when receiving electric current through the electric wire.

A sleeve includes an inner wall circumscribing the piston core defining a fluid passage between the inner wall and the outer wall. MR fluid flows through the fluid passage when the piston strokes inside the damper. The sheer resistance of the MR fluid is increased relative to the strength of the magnetic field generated by the coil. Thus, the level of vibration damping is determined by the strength of the magnetic field. At least one channel is formed in at least one of the inner wall and the outer wall. The channels can take different shapes including arcuate, rectangular, and triangular to meet the needs of a given vibration damper. At the channel, the distance is increased between the sleeve and the core.

The increased distance between the inner wall and the outer wall at the channel reduces the flow resistance variations derived from temperature induced viscosity changes of the MR fluid. The damper provides more consistent and precise damping properties when the impact of temperature induced viscosity variations of the MR fluid is reduced.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a sectional view of the damper showing the inventive piston;

DESCRIPTION OF THE PREFERRED EMBODIMENT

Figure 2A:
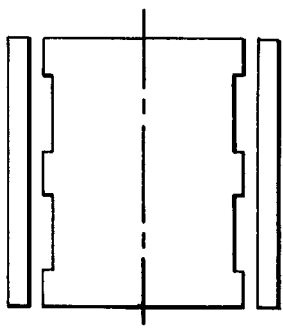
FIGS. 2a through 2r show alternative profiles of the channel of the present invention.

Referring to FIG. 1, a damper assembly for a motor vehicle suspension system is generally shown at 10. The assembly includes a housing 12 that defines a magneto rheological fluid chamber 14. A piston assembly 18 is slidably disposed within the fluid chamber 14.

The piston assembly 16 includes a piston core 18 that is affixed to a piston shaft 20. The piston core includes an outer wall 19. An electric coil 22 circumscribes the outer wall 19 and is coaxially aligned with the piston shaft 20. More than one electric coil 22 may also circumscribe the outer wall 19 to increase the surface area of the outer wall 19 subjected to the electric current passing through the coils 22. A retainer 23 retains the coil 22 against the piston core 18. The retainer 23 forms a smooth surface with the piston core 18 so that the piston core 18 presents a uniform surface. The piston shaft 20 defines a tube having an electric wire 24 inserted therethrough. The electric wire 24 connects to the coil 22 for providing electric current to the coil 22. When the coil 22 is charged with electric current, a magnetic field is generated, the purpose of which will be explained further below.

A sleeve 26 having an inner wall 27 circumscribes the piston core 18. An annular fluid passage 28 is formed between the inner wall 27 and the outer wall 19. When the piston assembly 16 strokes inside the fluid chamber 14, MR fluid is forced through the annular passage 28. When subjected to a magnetic field generated by the coil 22, the sheer properties of the MR fluid are altered. When not subjected to a magnetic field, the MR fluid behaves much like a Newtonian fluid. However, when subjected to a magnetic field, the sheer resistance of the MR fluid is increased proportional to the strength of the magnetic field. Under a magnetic field, the MR fluid behaves like a Bingham plastic. Therefore, the resistance to the stroking action of the piston assembly 16 can be increased by supplying an electric current to the coil 22.

FIG. 1 shows a channel 32 formed in the inner wall 27 having a diameter that is greater than the diameter of the inner wall 27. Therefore, the distance between the piston core 18 and the sleeve 26 is increased at the channel 32.

FIG. 2 shows profiles of alternative embodiments of the channel 32 of the present invention. Each of these profiles has proven to reduce the temperature related viscosity impact on the performance of the MR fluid. The choice of profiles depends upon the temperature characteristics and overall design of the damper assembly 10. Different profiles are more effective than others given the characteristics of a given damper assembly 10.

Figure 2B:
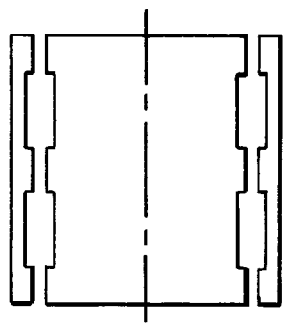
Figure 2C:
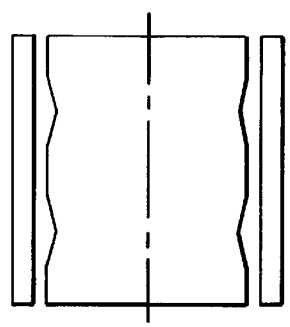
Figure 2D:
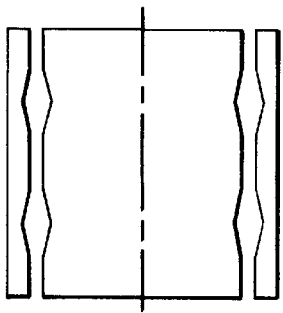
Figure 2E:
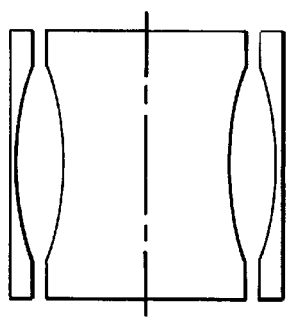
Figure 2F:
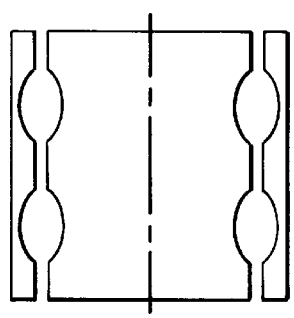
Figure 2G:
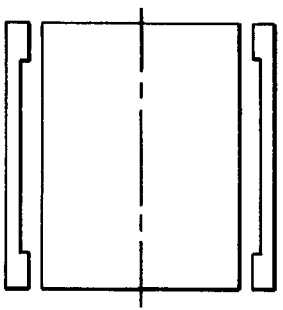
Figure 2H:
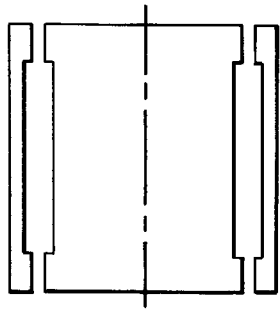
Figure 2I:
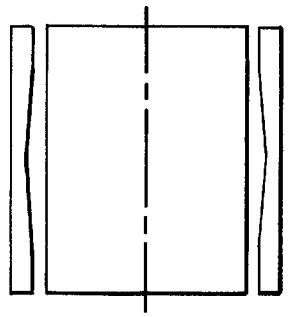
Figure 2J:
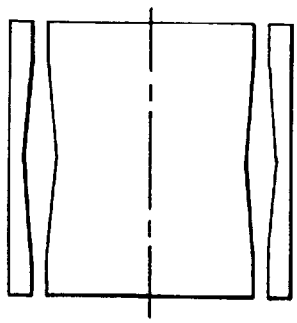
Figure 2K:
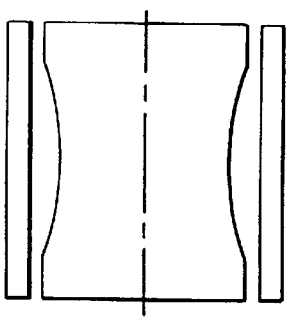
Figure 2L:
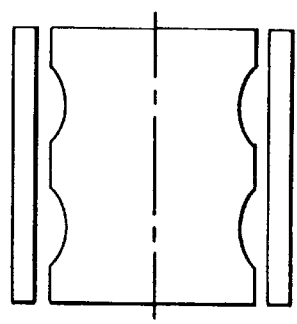
Figure 2M:
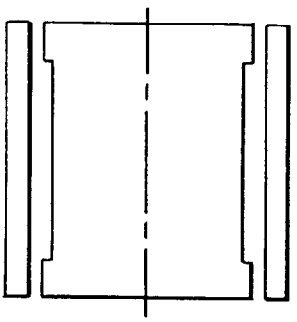
Figure 2N:
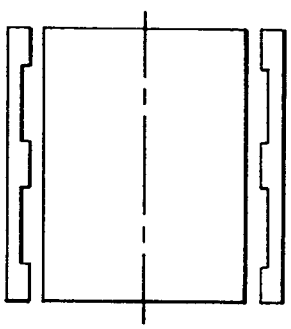
Figure 2O:
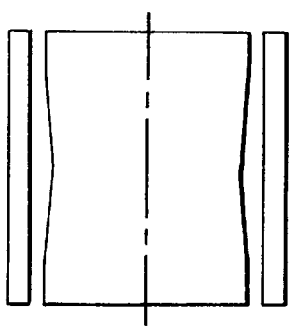
Figure 2P:
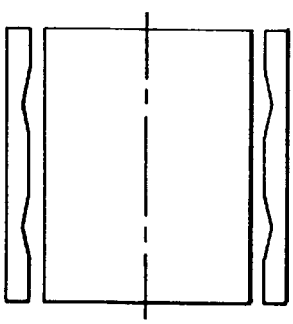
Figure 2Q:
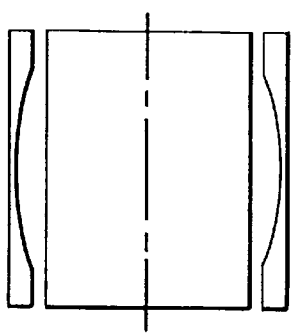
Figure 2R:
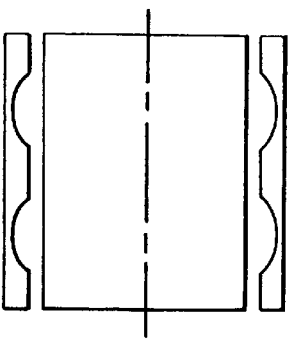

FIG. 2a shows two rectangular channels 32 formed in the piston core 18. FIG. 2b shows two rectangular channels 32 formed in both the piston core 18 and the sleeve 26. FIG. 2c shows two triangular channels 32 formed in the piston core 18. FIG. 2d shows two triangular channels 32 formed in both the piston core 18 and the sleeve 26. FIG. 2e shows one arcuate channel 32 in both the piston core 18 and the sleeve 26. FIG. 2f shows two arcuate channels 32 formed in both the piston core 18 and the sleeve 26. FIG. 2g shows one rectangular channel 32 formed in the sleeve 26. FIG. 2h shows one rectangular channel 32 formed in both the piston core 18 and the sleeve 26. FIG. 2i shows one triangular channel 32 formed in the sleeve 26. FIG. 2j shows one triangular channel 32 formed in both the piston core 18 and the sleeve 26. FIG. 2k shows one arcuate channel 32 formed in the piston core 18. FIG. 2l shows two arcuate channels 32 formed in the piston core 18. FIG. 2m shows one rectangular channel formed in the piston core 18. FIG. 2n shows two rectangular channels formed in the sleeve 26. FIG. 2o shows one triangular channel 32 formed in the piston core 18. FIG. 2p shows two triangular channels 32 formed in the sleeve 26. FIG. 2q shows one arcuate channel 32 formed in the sleeve 26. FIG. 2r shows two arcuate channels 32 formed in the sleeve 26.

The channel 32 generally aligns with the coil 22 in an area that is not subjected to the magnetic field generated by the coil 22. As is known in the art of magnetic flux generation, a magnetic field forms a circular path around, but not upon, a wire carrying an electrical current. Because the channel 32 is positioned adjacent the coil 22, the magnetic field generated by the coil 22 circumscribes the channel 32 and thus, there is no magnetic flux on the channel 32. To locate the channel 32 in the non-magnetic area of the annular fluid passage 28, it may be necessary to form all of, or part of the channel 32 in the retainer 23.

Referring again to FIG. 1, the sleeve 26 includes a first counter-bore 34 and a second counter-bore 36. A first end plate 38 is received by the first counter-bore 34. The first end plate 38 includes at least one end plate aperture 40 that allows the MR fluid to access the annual fluid passage 28. The sleeve 26 is crimped over the first end plate 38 to secure the first end plate 38 to the piston core 18. A second end plate 42 is received by the second counter-bore 36. The second end plate 42 includes at least one end plate aperture 44 that allows fluid to access the annular fluid passage 28. The sleeve 26 is crimped over the second end plate 42 to secure the second end plate 42 to the piston core 18. A shaft aperture 46 is disposed in the second end plate 42, into which the piston shaft 20 is inserted. A retaining ring 48 retains piston plate 42, and therefore piston assembly 16, to piston rod 20. Other methods of securing the end plates 38, 42 to the sleeve may be utilized such as, for example, threading the end plates 38, 42 onto the sleeve 26, welding the end plates 38, 42 onto the sleeve 26, and press fitting the end plates 38, 42 onto the sleeve 26. Other equivalent methods of affixing the end plates 38, 42 onto the sleeve may also be used.

The MR fluid flows through the annular fluid passage 28 in a flow that is generally laminar. Because laminar flow contacts a large wetted surface area within the fluid passage 28, it is susceptible to flow rate changes from viscosity variations derived from temperature changes. The impact of viscosity on the flow of the MR fluid is proportional to the distance separating the piston core 18 and the sleeve 26. Test data has proven that an increase in the space between the piston core 18 and the sleeve 26 in non-magnetic areas reduces the impact of viscosity on the flow rate of the MR fluid. Therefore, the channel 32 is positioned in a non-magnetic area of the piston assembly 16.

Figure 3:
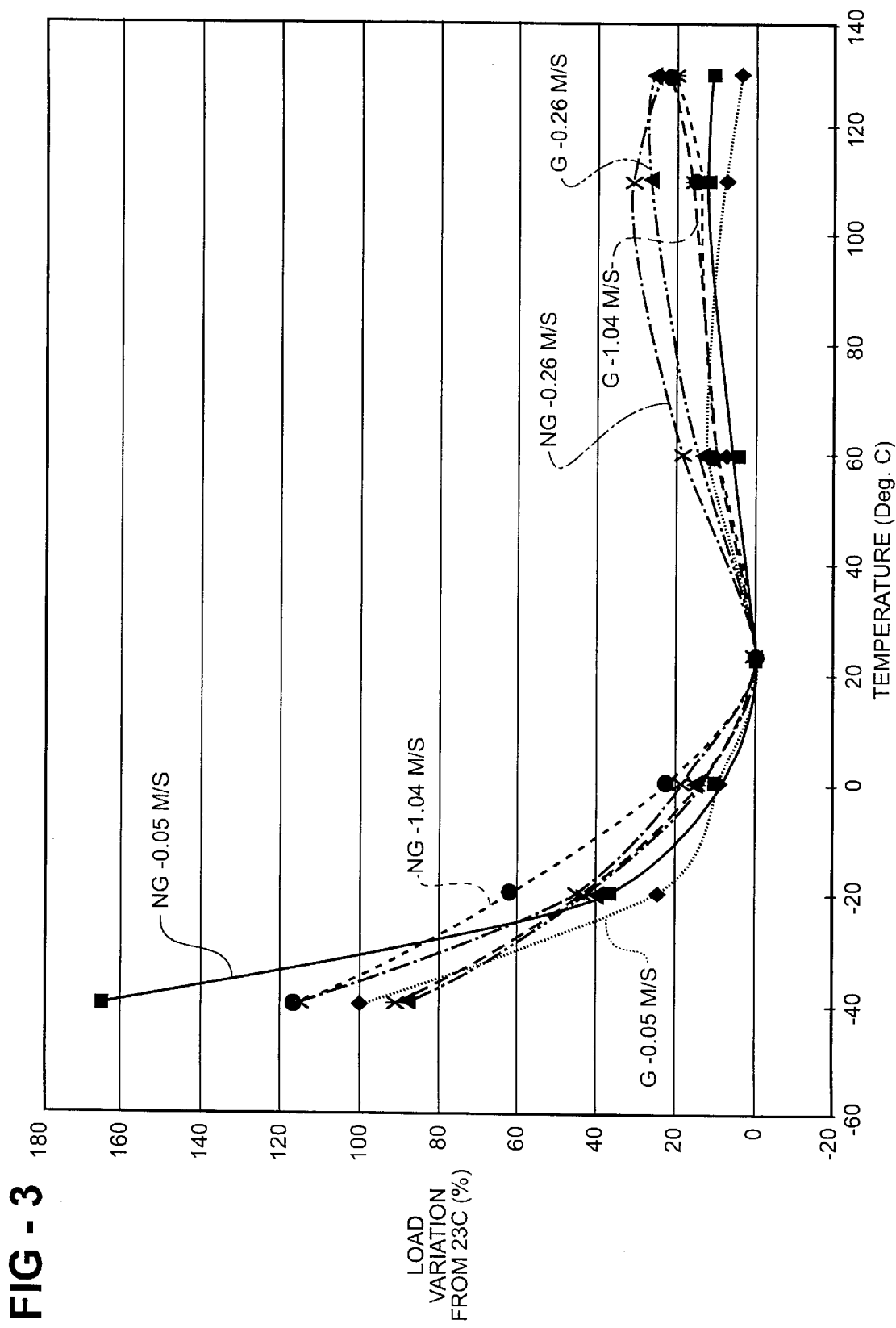
FIG. 3 is a graph showing the load variation reduction derived from the channel under a magnetic field relative to temperature.
Figure 4:
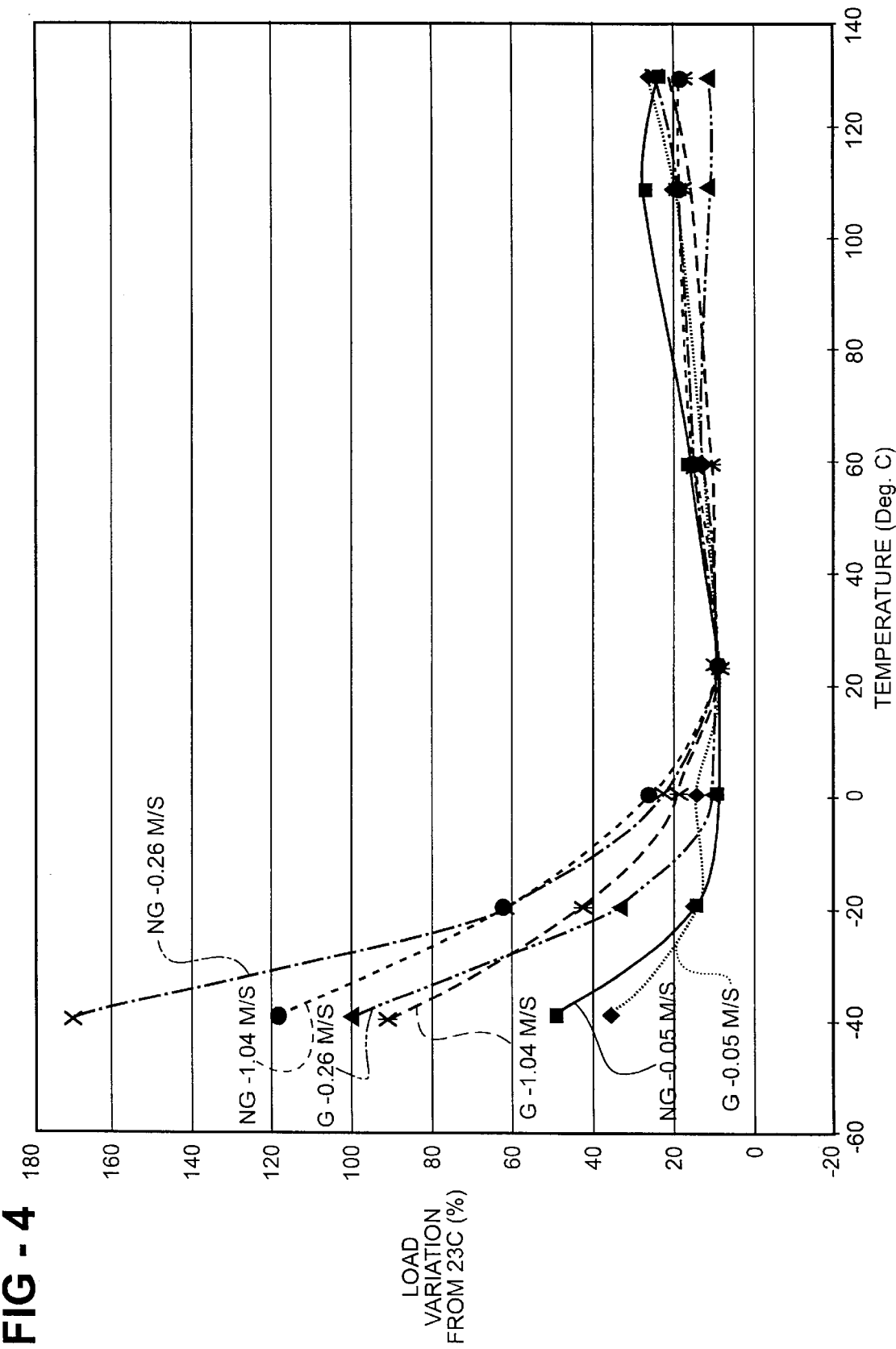
FIG. 4 is a graph showing the load variation reduction derived from the channel in the absence of a magnetic field relative to temperature.

The MR fluid is subjected to two different magnetic field states, "on state," under which the fluid is subjected to a magnetic field, and "off state," in which the fluid is not subjected to any magnetic field. Referring to FIGS. 3 and 4, the load variation of the MR fluid is charted against the temperature of the MR fluid. A comparison is made between three different fluid velocities, 0.05 m/s, 0.26 m/s, and 1.04 m/s. For each of these fluid velocities, two separate measurements were made. First, as represented with the letter G, are measurements made with a sleeve 26 having the above described channel (FIG. 2g). The second set of measurements, represented with NG, were made on a sleeve having a uniform inner diameter (no channel).

It is desirable to reduce the load variation of the MR fluid to as low a level as possible. Therefore, referring to FIG. 3 showing on state data and FIG. 4 showing off state data, measurements of load variation approaching zero are desirable. It should be noted that the data points in FIGS. 3 and 4 have been normalized at 23° C. The data indicates for both on state and off state comparisons, that the channel 32 significantly reduces the load variation when charted against temperature. The reduction in variation is most significant at temperatures below freezing, which is where the viscosity of the MR fluid increases most.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A piston assembly for magneto-rheological (MR) fluid vibration damper:
   a piston shaft;
   a piston core affixed to said piston shaft and having an outer wall circumscribed by at least one electric coil capable of generating a magnetic field;
   a sleeve encircling said piston core having an inner wall defining an annular fluid passage with said outer wall of said piston core allowing MR fluid to pass therethrough; and
   at least one of said inner wall and said outer wall defining at least one channel circumscribing said core thereby increasing the distance between said inner wall and outer wall at said channel.

2. An assembly as set forth in claim 1 wherein said sleeve includes first and second counter bores in each end thereof.

3. An assembly as set forth in claim 2 including a first end plate received by said first counter bore.

4. An assembly as set forth in claim 3 wherein said first end plate includes at least one aperture allowing MR fluid to pass through to said annular passage.

5. An assembly as set forth in claim 4 including a second end plate received by said second counter bore and having said piston shaft inserted therethrough.

6. An assembly as set forth in claim 5 wherein said second end plate includes at least one aperture allowing MR fluid to pass through to said annular passage.

7. An assembly as set forth in claim 6 wherein said sleeve includes a crimp at each end thereof securing said first and second end plates to said piston.

8. An assembly as set forth in claim 1 wherein said outer wall includes a retainer overlaying said at least one electric coil and forming smooth surface with said outer wall.

9. An assembly as set forth in claim 8, wherein said at least one groove is disposed in said retainer.

10. An assembly as set forth in claim 1 including an electric wire connected to said coil for providing electric current to said coil.

11. An assembly as set forth in claim 10 wherein said piston shaft defines a tube having said electric wire inserted therethrough.

12. An assembly as set forth in claim 1 further including at least two channels disposed in said outer wall.

13. An assembly as set forth in claim 1 further including at least two channels disposed in said inner wall.

14. An assembly as set forth in claim 1 further including at least two channels formed in each of said inner wall and said outer wall.

15. An assembly as set forth in claim 1 wherein said at least one channel comprises an arcuate groove.

16. An assembly as set forth in claim 1 wherein said at least one channel comprises a triangular groove.

17. An assembly as set forth in claim 1 wherein said at least one channel comprises a rectangular groove.

18. A vibration damper operably connected to a suspension system of a motor vehicle comprising:
   a housing defining a piston chamber having magneto-rheological (MR) fluid disposed therein;
   a piston slidably disposed within said piston chamber and being affixed to a piston shaft inserted through said housing;
   said piston including:
      a piston core defining an outer wall and having at least one electric coil coaxially aligned with said piston shaft capable of generating a magnetic field;
      a sleeve encircling said piston core having an inner wall defining an annular fluid passage with said outer wall of said piston core allowing MR fluid to pass therethrough; and
      at least one of said inner wall and said outer wall having at least one channel circumscribing said core thereby increasing the distance between said inner wall and outer wall at said channel.

19. A damper as set forth in claim 18 wherein said sleeve includes first and second counter bores disposed in each end thereof.

20. A damper as set forth in claim 19 including a first end plate received by said first counter bore.

21. A damper as set forth in claim 20 wherein said first end plate includes at least one aperture allowing MR fluid to pass through to said annular passage.

22. A damper as set forth in claim 21 including a second end plate received by said second bore and having said piston shaft inserted therethrough.

23. A damper as set forth in claim 22 wherein said second end plate includes at least one aperture allowing MR fluid to pass through to said annular passage.

24. A damper as set forth in claim 23 wherein said first and said second bores include a crimp clamping said first and said second plate to said piston core.

25. An assembly as set forth in claim 18 wherein said outer wall includes a retainer overlaying said at least one electric coil and forming smooth surface with said outer wall.

26. An assembly as set forth in claim 18 further including at least two channels disposed in said outer wall.

27. An assembly as set forth in claim 18 further including at least two channels disposed in said inner wall.

28. An assembly as set forth in claim 18 further including at least two channels formed in each of said inner wall and said outer wall.

29. An assembly as set forth in claim 18 wherein said at least one channel comprises an arcuate groove.

30. An assembly as set forth in claim 18 wherein said at least one channel comprises a triangular groove.

31. An assembly as set forth in claim 18 wherein said at least one channel comprises a rectangular groove.

32. A damper as set forth in claim 18 wherein said magnetic field passes through said annular passage.

33. A damper as set forth in claim 18 including an electric wire connected to said coil for providing electric current to said coil.

34. A damper as set forth in claim 33 wherein said piston shaft defines a tube having said electric wire inserted therethrough.

35. A damper as set forth in claim 18 wherein said at least one channel is aligned with said coil.

36. A vibration damper operably connected to a suspension system of a motor vehicle comprising:
   a housing defining a piston chamber having magneto-rheological (MR) fluid disposed therein;
   a piston slidably disposed within said piston chamber and being affixed to a piston shaft telescoping out of said piston chamber;

said piston including:
- a piston core having a piston wall with an outer diameter coaxially aligned with said piston shaft;
- a sleeve concentrically aligned with said piston core having a sleeve wall with a first inner diameter substantially parallel with said piston wall defining an fluid passage with said piston core;
- at least one electric coil encircling said piston core capable of transmitting a magnetic field defining a magnetic area of said annular passage; and
- wherein at least one of said piston wall and said sleeve wall include at least one channel circumscribing said core thereby increasing the distance between said piston wall and said sleeve wall at said channel.

37. A damper as set forth in claim 36 wherein said sleeve includes first and second counter bores in each end of said sleeve each having a third inner diameter greater than said first inner diameter.

38. A damper as set forth in claim 37 including first and second end plates received by said first and second counter bores.

39. A damper as set forth in claim 38 wherein one of said end plates includes a shaft aperture for receiving said shaft.

40. A damper as set forth in claim 39 wherein each of said end plates includes a least one fluid aperture allowing fluid to flow through to said fluid passage.

41. A damper as set forth in claim 40 wherein said piston shaft defines a tube having an electric wire inserted therein, said wire providing electric current to said coil.

42. An assembly as set forth in claim 36 wherein said at least one channel comprises an arcuate groove.

43. An assembly as set forth in claim 36 wherein said at least one channel comprises a triangular groove.

44. An assembly as set forth in claim 36 wherein said at least one channel comprises a rectangular groove.

45. A damper as set forth in claim 36 wherein said channel is disposed in an area of said fluid passage not subjected to said magnetic field generated by said coil.

46. An assembly as set forth in claim 36 wherein said outer wall includes a retainer overlaying said at least one electric coil and forming smooth surface with said outer wall.

47. An assembly as set forth in claim 36 further including at least two channels disposed in said outer wall.

48. An assembly as set forth in claim 36 further including at least two channels disposed in said inner wall.

49. An assembly as set forth in claim 36 further including at least two channels formed in each of said inner wall and said outer wall.

* * * * *